United States Patent Office 2,760,966
Patented Aug. 28, 1956

2,760,966

COMPOUNDS FOR SYNTHESIZING STEROIDS

William S. Knowles, Kirkwood, Mo., assignor to Monsanto Chemical Company, St. Louis, Mo., a corporation of Delaware No Drawing. Application June 17, 1953,
Serial No. 362,413

7 Claims. (Cl. 260—343.2)

This invention relates to methods and novel compounds useful in the synthesis of 17-formyl-cyclopent-16-eno-10,-13-dimethyl-$\Delta^{4,9(11)}$-decahydrophenanthren-3-one which is useful in the synthesis of steroidal compounds of the cycylopentanodimethyl-polyhydrophenanthrene series, and which may be represented by the structural formula

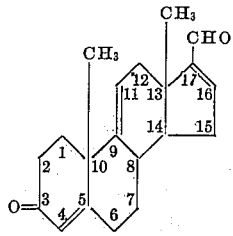

In particular this invention relates to methods and novel compounds useful in the synthesis of $\Delta^{9(11),16}$-bisdehydro-norprogesterone.

The present invention will be described in detail, with respect to its preferred embodiment however, it is to be understood that such is not limitative of the invention.

In the total synthesis of physiologically active steroids $\Delta^{9(11),16}$-bisdehydro-norprogesterone, hereafter referred to as the 17-formyl steroid, is a key intermediate. It has been synthesized from anti-trans-1,8a-dimethyl, $\Delta^{6,9,10a(1)}$-octahydrophenanthren-2-one, hereafter referred to as the "tricyclic ketone." However, the processes which have been suggested in its preparation from tricyclic ketone have been found expensive, procedurally lengthy and cumbersome.

It is an object of this invention to provide a less expensive and less cumbersome process for the synthesis of 17-formyl-cyclopent-16-eno-10,13-dimethyl-$\Delta^{4,9(11)}$ - decahydrophenanthren-3-one from 1,8a-dimethyl, $\Delta^{6,10a(1)}$-decahydrophenanthren-2-one. It is a particular object of this invention to provide a process for the synthesis of $\Delta^{9(11),16}$-bisdehydro-norprogesterone, the 17-formyl steroid from a compound herein referred to as "tricyclic ketone." It is a still further object of this invention to provide new and novel compounds useful in the preparation of steroids, such as the adrenal cortical hormones. Further objects will become apparent hereinafter.

The sequence of steps or series of reactions proceeding to the 17-formyl steroid for purposes of this invention is outlined schematically in the following diagram, the novel steps and compounds of the preferred embodiment of the present invention comprising those represented in proceeding from 1,8a-dimethyl, $\Delta^{6,10a(1)}$-decahydrophenanthren-2-one (compound II) to 3-keto-16,17-dihydroxy-$\Delta^{4,9(11)}$-D-homoandrostadiene (compound IX) of the illustrative diagram.

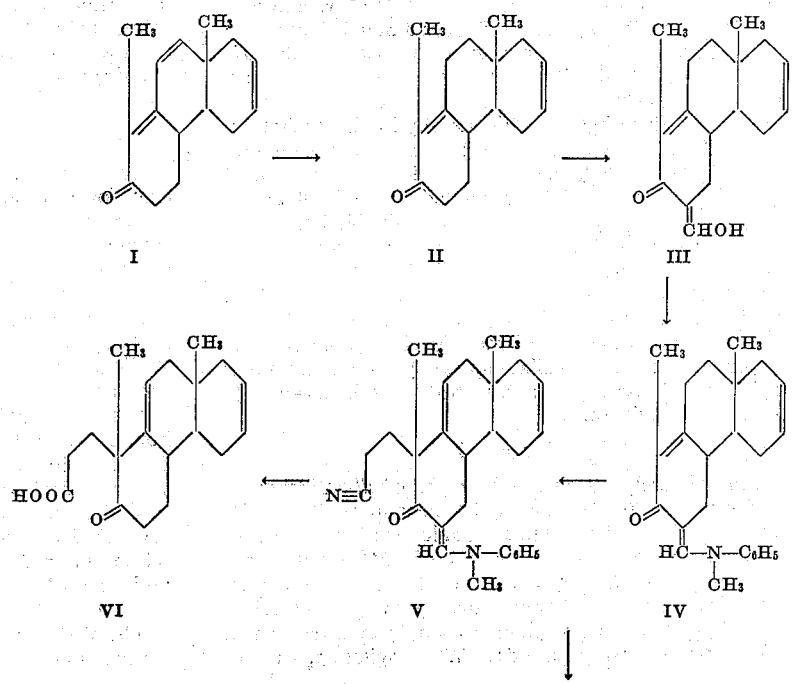

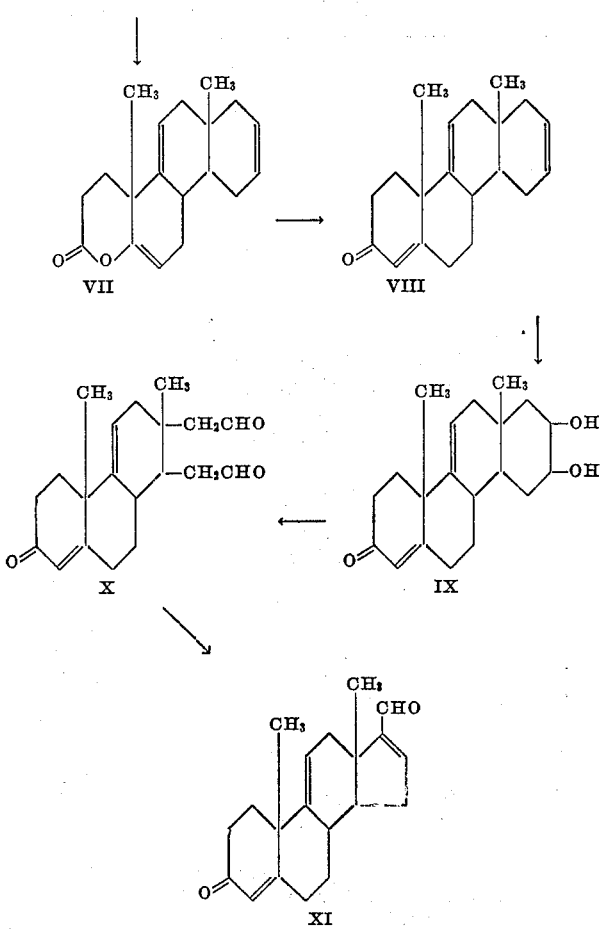

As indicated by the foregoing diagram a 17-formyl-cyclopent-16-eno-10,13-dimethyl-$\Delta^{4,9(11)}$ - decahydrophenanthren-3-one, for example the 17-formyl steroid, can be obtained by means of a relatively simple synthesis. With respect to the preferred embodiment of this invention the "tricyclic ketone" (compound I) employed in the preparation of the 1,8a-dimethyl, $\Delta^{6,10a(1)}$-decahydrophenanthren-2-one reactant may be readily prepared in accordance with the procedure of R. B. Woodward, J. A. C. S., vol. 74, p. 4223 (1952), and may be employed in the form of the racemic mixture (namely, the $dl$-series) or in its optically active form (i. e. isomer) such as the levo-rotatory form.

The 1,8a-dimethyl, $\Delta^{6,10a(1)}$-decahydrophenanthren-2-one reactant of this invention is prepared by the addition of one molecule of hydrogen to the 9—10 double bond of the "tricyclic ketone" (compound I), without at the same time adding hydrogen to the 6—7 double bond and/or the 10a—1 double bond. This step is conveniently carried out by the method described in United States application Serial No. 339,470, filed February 27, 1953, of Harold Raffelson, which method comprises passing hydrogen into a solution of the tricyclic ketone containing dispersed therein a palladium catalyst, until one molar equivalent of hydrogen is absorbed. As illustrative of this step is the following:

Example I

Approximately 10 parts by weight of $dl$-anti-trans-1,8-a-dimethyl-$\Delta^{6,9,10a(1)}$ - octahydrophenanthren-2-one (M. P. 72–73° C.) is admixed in a suitable reaction vessel with approximately 80 parts by weight of 95% ethanol, approximately 2.0 parts by weight of a 5% aqueous sodium hydroxide solution, and approximately one part by weight of a 2% palladium-strontium carbonate catalyst (which had been previously reduced). While agitating, gaseous hydrogen is passed into the mixture at about 25% C. and at substantially atmospheric pressure. After absorption of substantially one molar equivalent of hydrogen, which takes about 1.2 hours, the catalyst is filtered off and the filtrate is neutralized with dilute sulfuric acid and is then subjected to vacuum distillation. The residue is then taken up with benzene, and is then washed with several small portions of water. The layers are separated and the organic layer is subjected to vacuum distillation. A substantially 100% yield of a colorless oily product identified as $dl$-anti-trans-1,8a-dimethyl - $\Delta^{6,10a(1)}$ - decahydrophenanthren-2-one is obtained.

Example II

Approximately 22.8 parts by weight of the levo-rotatory form of anti-trans-1,8a-dimethyl-$\Delta^{6,9,10a(1)}$-octahydrophenanthren-2-one (M. P. 42–44° C.) is admixed in a suitable reaction vessel with approximately 80 parts by weight of isopropanol, approximately 2.85 parts by weight of a 2% palladium-strontium carbonate catalyst (which had been previously reduced) and approximately 2.3 parts by weight of a 10% potassium hydroxide solution. While agitating, gaseous hydrogen is passed into the mixture at about 25° C. until approximately one molar equivalent of hydrogen is absorbed, which takes about 1.2 hours. The catalyst is filtered off and the filtrate is neutralized with dilute hydrochloric acid and subjected to vacuum distillation. The residue is then washed with several small portions of water and is then subjected to vacuum distillation. The residual substantially colorless oil so obtained is identified as the levo-rotatory form of anti-trans-1,8a-dimethyl-$\Delta^{6,10a(1)}$decahydrophenanthren-2-one, the yield being substantially 100%.

The first step of the method of this invention is the formylation of the dihydro tricyclic ketone (compound II) to give a hydroxy methylene compound of the structural formula

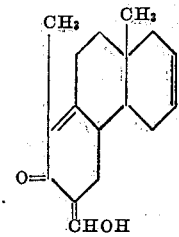

The hydroxy methylene compound (compound III) is readily prepared by reacting ethyl formate with the corresponding dihydro tricyclic ketone (compound II) in the presence of sodium methylate. As illustrative of this step is the following:

*Example III*

To a suitable reaction vessel containing an intimately mixed mixture of 32.4 parts by weight of sodium methylate, 303.6 parts by weight of benzene and 76.2 parts by weight of ethyl formate is added a solution of 46 parts by weight of *dl*-anti-trans-1,8a-dimethyl, $\Delta^{6,10a(1)}$-decahydrophenanthren-2-one in 202.4 parts by weight benzene and the mix so obtained agitated at about 25° C. for about 16 hours. The mix is then cooled to about 5° C. and thereto is added and intimately mixed 40 parts by weight of water and 45 parts by weight of acetic acid in 190 parts by weight of water while maintaining the temperature below 30° C. The mix is agitated for about 30 minutes and the aqueous layer separated. The aqueous layer is extracted with several small portions of benzene. The benzene extracts are then combined with the original organic layer and the combined mix subjected to vacuum distillation. The brown oily residue is taken up with 70 parts by weight of heptane. Upon cooling to about 0° C. yellow crystalline *dl*-anti-trans-1,8a-dimethyl-3-(hydroxy) methylene, $\Delta^{6,10a(1)}$-decahydrophenathren-2-one separates. The crystalline material is recovered and dried and its melting point found to be 83–84.5° C. The yield is 86% by weight.

The second step of the method of this invention is the conversion of the hydroxy methylene compound (compound III) to the methylanilino compound (compound IV). The methylanilino compound (compound IV) is readily prepared by condensing the corresponding hydroxy methylene compound (compound III) with N-methylaniline. As illustrative of this step is the following:

*Example IV*

To a suitable reaction vessel containing 38.9 parts by weight of *dl*-anti-trans-1,8a-dimethyl, 3-(hydroxy) methylene, $\Delta^{6,10a(1)}$-decahydrophenanthren-2-one dissolved in 177.6 parts by weight of methanol is slowly added and intimately mixed 4.4 parts by weight of N-methylaniline while maintaining the temperature during the addition at about 50° C. The mix is agitated for about 16 hours while permitting the temperature to drop to room temperature. The mix is cooled to about 0° C., filtered and the collected yellow crystalline product washed with methanol. The product is dried and identified as *dl*-anti-trans-1,8a-dimethyl, 3-(N-methylanilino) methylene, $\Delta^{6,10a(1)}$-decahydrophenanthren-2-one (M. P. 124–125° C.). The yield is 90% of theory.

The next step in the method of this invention is the formation of the 1-($\beta$-cyanoethyl) substituted methylanilino derivative of the hydroxy-methylene dihydro tricyclic ketone (compound V). In its preparation a new asymmetric center is introduced and thus a mixture of stereoisomers results. This mixture is preferably not isolated and separated into its isomeric parts, but converted directly by vigorous base hydrolysis to the corresponding carboxy ethyl derivative (compound VI). The carboxy ethyl derivative so obtained is a mixture of isomeric keto acids, which isomers for purposes of this invention may be represented structurally and identified as follows:

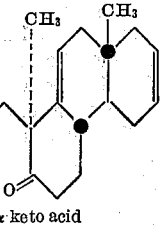
$\alpha$ keto acid

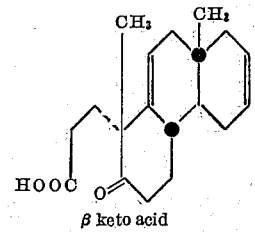
$\beta$ keto acid

While both of the isomeric $\alpha$ and $\beta$ keto acids may be converted to a tetracyclic ketone of the general structure of compound VIII, only the $\beta$-keto acid as identified herein produces a tetracyclic ketone corresponding in configuration about its asymmetric carbon atoms to that of the 17-formyl steroid, i. e., $\Delta^{9(11),16}$-bisdehydro-norprogesterone.

As illustrative of the preparation of the keto acid (compound VI) is the following:

*Example V*

To a suitable reaction vessel containing 100 parts by weight of *dl*-anti-trans-1,8a-dimethyl, 3(N-methylanilino) methylene, $\Delta^{6,10a(1)}$-decahydrophenanthren-2-one dissolved in 1360 parts by weight of tert. butyl alcohol is added and intimately mixed 60 parts by weight of acrylonitrile and 18 parts by weight of 40% aqueous benzyl trimethyl ammonium hydroxide in 39 parts by weight tert. butanol and 5 parts by weight water. The air of the system is replaced by nitrogen and the reaction mix is heated at 50–55° C. for about 44 hours. The system is then cooled and the catalyst neutralized with 2.5 parts by weight of acetic acid. The tert. butyl alcohol is then removed under vacuum at a maximum temperature of 50° C. and a final pressure of 2 mm. To the oily residue so obtained is added 325 parts by weight of water and 450 parts by weight diethyl ether. The mixture is stirred for one-half hour and then the ether layer separated. The aqueous layer is extracted with 225 parts by weight of ether and the ether extract combined with the original ether layer. The solution is then extracted twice with 500 parts by weight of 10% hydrochloric acid and twice with 100 parts by weight of water. The ether is evaporated and the residue dissolved in a solution of 120 parts by weight potassium hydroxide in 1000 parts by weight water. The resultant solution is extracted with 80 parts by weight of ether to remove alkali insolubles and then refluxed at 100–102° C. for ten hours under an atmosphere of nitrogen. The alkali solution of *dl*-keto acids is then cooled and extracted with 160 parts by weight of ether. The aqueous phase is then acidified with 150 parts by weight of 35% hydrochloric acid. The precipitated keto acids are filtered off and extracted with three 240 parts by weight portions of ether. The extracts are combined and washed with two 250 parts by weight portions of water. Upon evaporating the ether solvent there is obtained 74.3 parts by weight of crude *dl*-keto acids. This crude which contains a weight ratio of $\alpha$-isomer to $\beta$-isomer of approximately 3:1 is then taken up with warm ether and allowed to stand for about 20 hours. The white crystalline $\beta$-isomer of the *dl*-keto acid separates leaving the $\alpha$-isomer in solution. The white solid $\beta$-isomer is filtered off and is found to have a melting point in the range of 171–173° C. The yield of the $\beta$-isomer of the *dl*-keto acid is 22.2%.

The next step in the method of this invention is the conversion of the keto acid (compound VI) to the enol lactone (compound VII) by boiling the former with acetic anhydride in the presence of a small amount of sodium acetate. As illustrative of this step is the following:

*Example VI*

30.76 parts by weight of the $\beta$-form of *dl*-anti-trans- 1,8a-dimethyl, 1-(β-carboxy ethyl), Δ$^{6,10}$ - decahydrophenanthren-2-one (M. P. 171–173° C.) is admixed with 0.15 part by weight of anhydrous sodium acetate and 248.4 parts by weight of acetic anhydride and the mixture refluxed for about 4 hours in an atmosphere of nitrogen. The acetic anhydride is removed under reduced pressure. Thereafter the residue is taken up with diethyl ether. The ether solution is washed with aqueous sodium bicarbonate solution and then with water. The ether solution is then cooled to 0° C. whereupon white crystalline dl-3-keto-Δ$^{5,9(11),16}$-4-oxa-D-homoandrostatriene having a melting point of about 99.8–101.2° C.

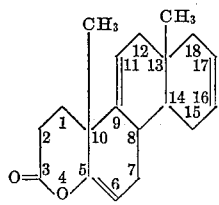

precipitates and is recovered. The yield of the dl-enol lactone is 91.5% by weight.

The next step in the method of this invention is the preparation of the tetracyclic ketone (compound VIII) from the enol lactone (compound VII) by reacting the latter with a methyl magnesium halide in diethyl ether, decomposing the addition product with dilute mineral acid, and then treating the ether solubles with an alcohol solution of an alkali metal hydroxide. As illustrative of this step is the following:

Example VII

To a solution of 21.5 parts by weight of dl-3-keto-Δ$^{5,9(11),16}$-4-oxa-D-homoandrostatriene (M. P. 99.8–101.2° C.) in 160 parts by weight of benzene and 800 parts by weight of ether is added over a period of about ten minutes a solution of 18.1 parts by weight of methyl magnesium bromide in 280 parts by weight of ether while maintaining the temperature of the system at about —55° C. and under an atmosphere of nitrogen. Upon completion of the methyl magnesium bromide addition the mix is agitated at —55° C. for about one hour. To the cold mix so obtained is added 300 parts by weight of an ice cold 6.5% hydrochloric acid and the mix agitated at 0° C. for about 15 minutes. The aqueous layer is separated and washed with several small portions of diethyl ether. The ether extracts and the original organic layer are combined and the ether evaporated. The residue is then taken up with 1200 parts by weight of methanol and thereto is added 18 parts by weight of sodium hydroxide dissolved in 180 parts by weight of water. The mix so obtained is refluxed for about 2 hours in an atmosphere of nitrogen. The mix is then cooled and most of the methanol evaporated under vacuum. Then 40 parts by weight of water is added and the aqueous layer extracted with several portions of ether. The ether extracts are combined and washed twice with water. The ether layer is then subjected to distillation and the solid residue (19.3 parts by weight) after recrystallization from methanol yields white crystalline dl-3-keto-Δ$^{4,9(11),16}$-D-homoandrostatriene having a melting point of about 147–148° C. The yield of tetracyclic ketone is 85% of theory.

The levo-rotatory form of 3-keto-Δ$^{4,9(11),16}$-D-homoandrostatriene is a white crystalline mass possessing a melting point of about 174–175° C. and is obtained from the levo-rotatory form of anti-trans-1,8a-dimethyl, Δ$^{6,10a(1)}$-decahydrophenanthren-2-one by (1) reacting the latter in accordance with the procedure of Example III with ethyl formate in the presence of sodium methylate, (2) condensing the crystalline 3-hydroxymethylene derivative (M. P. 99.5–100.5° C.) so obtained in accordance with the procedure of Example IV with N-methylaniline to form the yellow oily N-methylanilino compound, which compound is then (3) reacted with acrylonitrile under alkaline conditions to provide for the 1-(β-cyanoethyl) derivative, which derivative is then converted (4) by vigorous base hydrolyses to the oily mixture of α- and β-keto-acids, which mixture of acids is then (5) heated with acetic anhydride in the presence of sodium acetate to form an oily mixture of α- and β-enol-lactones, which oily mixture is then treated as follows:

49.7 grams of the crude oil mixture of α- and β-enol lactones derived as outlined above from the levo-rotatory form of anti-trans-1,8a-dimethyl, Δ$^{6,10a(1)}$-decahydrophenanthren-2-one, which contains approximately 25% by weight of the β-isomer of optically active enol lactone, is dissolved in 2500 cc. of diethyl ether and cooled to —55° C. Approximately 250 cc. (about 5.7 molar equivalents) of methyl magnesium bromide is added over about 15 minutes while keeping the temperature below —50° C. The reaction system is maintained at —50° C. for about 1 hour and 15 minutes after the addition of the Grignard reagent. Thereupon 100 cc. of acetone is added to use up the excess Grignard reagent. The solution is then acidified with 250 cc. of concentrated hydrochloric acid diluted with about 800 cc. of water. The organic layer is separated and concentrated by evaporation. The heavy dark oily colored residue is then dissolved in 1600 cc. of methyl alcohol and admixed with 2.5 parts by weight of sodium hydroxide dissolved in 100 cc. of water. The solution so obtained is refluxed under an atmosphere of nitrogen for 2 hours and then the solvent partially removed under reduced pressure. The concentrated liquor is reduced to a volume of about 200 cc. Thereupon 800 cc. of water and 800 cc. of diethyl ether is added and the mixture agitated vigorously and then allowed to stand overnight. The layers are separated and the aqueous layer is extracted with several small portions of ether and the extracts combined with the original ether layer and the solution subjected to vacuum distillation. The crystalline substance so obtained is then dissolved in methanol. To the methanol solution is added a solution containing 5 parts by weight of semi-carbazide-hydrochloride and 5 parts by weight of sodium acetate in 40 cc. of methyl alcohol. The mixture is agitated and filtered. The filtrate is heated on a steam bath for 45 minutes during which time the semi-carbazone of the levo-rotatory form of the tetracyclic ketone separates. The solution is cooled and filtered yielding 5.6 parts by weight of a light yellow crystalline solid having a melting point of 245–248° C. The solid material so obtained is admixed with 750 cc. of heptane and 750 cc. of 2-N hydrochloric acid and refluxed for about 3 hours. The organic layer is separated and the solvent is distilled off under reduced pressure. The crystalline residue so obtained is washed with methyl alcohol leaving 3.34 grams of white crystals of the levo-rotatory form of tetracyclic ketone (melting point of about 174–175° C.).

In the next step of the method of this invention the tetracyclic ketone (compound VIII) is converted to the 16,17-glycol (compound IX) by treatment of the former with silver acetate and iodine. The 16,17-glycol (compound IX) so obtained is to be distinguished from the 3-keto-16,17-dihydroxy-Δ$^{4,9(11)}$-D-homoandrostadiene described by R. B. Woodward, J. A. C. S., vol. 74, p. 4223ff. Both the 16,17-glycol (compound IX) of this invention and Woodward's 3-keto-16,17-dihydroxy-Δ$^{4,9(11)}$-D-homoandrostadiene are cis-glycols, however, with respect to the plane of the nuclear carbon atoms of the cyclohexyl ring (ring D) the hydroxy substituents of Woodward's compound are below the plane (i. e. it is an α,α-cis-glycol) whereas in the 16,17-glycol of the present invention the hydroxy substituents are above the plane (i. e. it is a β,β-cis-glycol) of the nuclear carbon atoms. As illustrative of this step is the following:

Example VIII 28 parts by weight of dl-3-keto-Δ$^{4,9(11),16}$-D-homoandrostatriene (M. P. 147–148° C.) is dissolved in 800 parts by weight of glacial acetic acid and thereto is added and intimately mixed 38.2 parts by weight of silver acetate and 25.3 parts by weight of iodine. Upon agitating the mix so obtained for one hour at 20–25° C. 1.8 parts by weight of water is added and the mix heated to 90–95° C. and maintained at that temperature for three hours. The reaction mix is cooled and filtered and the filtrate subjected to vacuum distillation to remove the bulk of the acetic acid solvent. The residue is then taken up with 500 parts by weight of methyl alcohol and neutralized to a pH of 10 with potassium hydroxide. To the solution so neutralized is added 90 parts by weight of an 11% by weight methyl alcohol solution of potassium hydroxide and the mixture allowed to stand for about 16 hours at 20–25° C. under an atmosphere of nitrogen. The solution is then neutralized with 35% hydrochloric acid. The neutralized solution is then subjected to vacuum distillation. The residue is then dissolved in 1000 parts by weight of chloroform and the solution washed with several small portions of water. The chloroform solution is then dried over magnesium sulfate and filtered. The filtrate is then subjected to vacuum distillation to remove the solvent. Upon recrystallization of the residue from methyl alcohol there is obtained 21.3 parts by weight of the white crystalline $dl$-3-keto-16$\beta$,17$\beta$-dihydroxy-$\Delta^{4,9(11)}$-D-homoandrostadiene (M. P. 215–218° C.).

Employing the same procedure as above but replacing the $dl$-3-keto-$\Delta^{4,9(11),16}$-D-homoandrostatriene with an equimolar amount of the levo-rotatory form of 3-keto-$\Delta^{4,9(11),16}$-D-homoandrostatriene (M. P. 174–175° C.) there is obtained an excellent yield of the crystalline optically active 3-keto,16$\beta$,17$\beta$-dihydroxy-$\Delta^{4,9(11)}$-D-homoandrostadiene (M. P. 185–187° C.).

The next step of this invention is the preparation of the dialdehyde (compound X) via the oxidation of the glycol (compound IX) with periodic acid, which compound is preferably not isolated but heated in solution in the presence of piperidine acetate to reclose ring D to give the 17-formyl steroid (compound XI). As illustrative of this step is the following:

*Example IX*

45 parts by weight of $dl$-3-keto-16$\beta$,17$\beta$-dihydroxy, $\Delta^{4,9(11)}$-D-homoandrostadiene is dissolved in 2000 parts by weight of dioxane. Thereto is added a solution of 45 parts by weight of periodic acid dihydrate in 800 parts by weight of water. The mix so obtained is agitated at 0° C. under an atmosphere of nitrogen for 14 hours. Thereupon the dioxane is distilled off under reduced pressure and the residue taken up with water. The aqueous phase is then extracted with several 100 parts by weight portions of ether. The ether extracts are combined and washed with a 5% aqueous sodium carbonate solution. The organic layer is then dried over magnesium sulfate and filtered. Upon removing the ether from the filtrate so obtained the residue is dissolved in 2500 parts by weight of benzene. To the solution so obtained is added 20 parts by weight of acetic acid and 10 parts by weight of piperidine and the mix so obtained heated at 60° C. for one hour in an atmosphere of nitrogen. The resultant mix is cooled and washed successively with 5% hydrochloric acid, 5% aqueous sodium carbonate, and finally with water. The benzene layer is then dried over magnesium sulfate and filtered. The solution is evaporated to dryness and upon recrystallizing the residue from benzene there is obtained 28 parts by weight of white crystalline $dl$-$\Delta^{9(11),16}$-bisdehydro-norprogesterone (M. P. 178–178.5° C.).

Employing the same procedure as above but replacing the $dl$-3-keto-16$\beta$,17$\beta$-dihydroxy, $\Delta^{4,9(11)}$-D-homoandrostadiene with an equimolar amount of the 3-keto-16$\beta$,17$\beta$-dihydroxy, $\Delta^{4,9(11)}$-D-homoandrostadiene crystalline isomer obtained from the levo-rotatory form of the tetracyclic ketone (M. P. 174–175° C.) an excellent yield of white crystalline dextro-rotatory form of $\Delta^{9(11),16}$-bisdehydro-norprogesterone (M. P. 160.5–161.6° C.) is obtained.

It is to be understood that the invention is not limited to the exact details of operation of the compounds shown and described, since obvious modifications and equivalents will be apparent to those skilled in the art and are to be construed to be within the spirit and scope of this invention.

This application is a continuation-in-part of my copending application Ser. No. 345,699, filed March 30, 1953.

ADDENDUM

In a similar manner employing the process outlined in column 7, line 64, through to line 54 in column 8, the dextro-rotatory form of tetracyclic ketone (melting point 174–175° C.) is obtained beginning with the dextro-rotatory form of anti-trans-1,8a-dimethyl, $\Delta^{6,10a(1)}$-decahydrophenanthren-2-one, which compound is obtained by the addition of one mole of hydrogen to the 9-10 double bond of the dextro-rotatory form of anti-trans-1,8a-dimethyl-$\Delta^{6,9,10a(1)}$-octahydrophenanthren-2-one (M. P. 42–44° C.).

Employing the procedure set forth in Example IX but replacing the $dl$-3-keto-16$\beta$,17$\beta$-dihydroxy, $\Delta^{4,9(11)}$-D-homoandrostadiene with an equimolar amount of the 3-keto-16$\beta$,17$\beta$-dihydroxy, $\Delta^{4,9(11)}$-D-homoandristadiene optically active isomer obtained from the dextro-rotatory form of the tetracyclic ketone (M. P. 174–175° C.) an excellent yield of white crystalline levo-rotatory form of $\Delta^{9(11),16}$-bisdehydro-norprogesterone (M. P. 160.5–161.5° C.) is obtained.

The dextro-rotatory form of $\Delta^{9(11),16}$-disdehydronorprogesterone corresponds in configuration about its asymmetric centers to the asymmetric centers of the adrenal cortical hormones.

The oily mixture of $\alpha$- and $\beta$-keto-acids described in column 8, lines 1–3 may be prepared as follows:

To a suitable reaction vessel containing 100 parts by weight of the optically active anti-trans-1,8a-dimethyl, 3(N-methylanilino) methylene, $\Delta^{6,10a(1)}$-decahydrophenanthren-2-one dissolved in 1360 parts by weight of tert. butyl alcohol is added and intimately mixed 60 parts by weight of acrylonitrile and 18 parts by weight of 40% aqueous benzyl trimethyl ammonium hydroxide in 39 parts by weight tert. butanol and 5 parts by weight water. The air of the system is replaced by nitrogen and the reaction mix is heated at 50–55° C. for about 44 hours. The system is then cooled and the catalyst neutralized with 2.5 parts by weight of acetic acid. The tert. butyl alcohol is then removed under vacuum at a maximum temperature of 50° C. and a final pressure of 2 mm. To the oily residue so obtained is added 325 parts by weight of water and 450 parts by weight diethyl ether. The mixture is stirred for one-half hour and then the ether layer separated. The aqueous layer is extracted with 225 parts by weight of ether and the ether extract combined with the original ether layer. The solution is then extracted twice with 500 parts by weight of 10% hydrochloric acid and twice with 100 parts by weight of water. The ether is evaporated and the residue dissolved in a solution of 120 parts by weight potassium hydroxide in 1000 parts by weight water. The resultant solution is extracted with 80 parts by weight of ether to remove alkali insolubles and then refluxed at 100–102° C. for ten hours under an atmosphere of nitrogen. The alkali solution of the optically active keto acids is then cooled and extracted with 160 parts by weight of ether. The aqueous phase is then acidified with 150 parts by weight of 35% hydrochloric acid. The crude keto-acids are separated and extracted with several small portions of ether. The ether extracts are combined and washed with water. Upon evaporating the ether solvent there is obtained a crude oily mixture of $\alpha$- and $\beta$-isomers of the optically active keto-acids in a weight ratio of approximately 3:1.

What is claimed is:

1. A process of preparing 3-keto-16$\beta$,17$\beta$-dihydroxy, $\Delta^{4,9(11)}$-D-homoandrostadiene which comprises heating 1,8a-dimethyl-1-($\beta$-carboxyethyl), $\Delta^{6,10}$-decahydrophenanthren-2-one with acetic anhydride in the presence of sodium acetate to form 3-keto-$\Delta^{5,9(11),16}$-4-oxa-D-homoandrostatriene, reacting 3-keto-$\Delta^{5,9(11),16}$-4-oxa-D-homoandrostatriene with a methyl magnesium halide in the presence of ether, decomposing the addition product so obtained by acidification with mineral acid, treating the ether solubles of the acidified mix with an alkali metal hydroxide and recovering 3-keto-$\Delta^{4,9(11),16}$-D-homoandrostatriene, oxidizing the 3-keto-$\Delta^{4,9(11),16}$-D-homoandrostatriene so formed with iodine in the presence of silver acetate, hydrolyzing the product so obtained to form 3-keto-16$\beta$,17$\beta$-dihydroxy-$\Delta^{4,9(11)}$-D-homoandrostadiene.

2. 3-keto-$\Delta^{5,9(11),16}$-4-oxa-D-homoandrostatriene.

3. *dl*-anti-trans-3-keto-$\Delta^{5,9(11),16}$-4-oxa-D-homoandrostatriene.

4. 3-keto-$\Delta^{4,9(11),16}$-D-homoandrostatriene.

5. *dl*-3-keto-$\Delta^{4,9(11),16}$-D-homoandrostatriene.

6. The levo-rotatory form of 3-keto-$\Delta^{4,9(11),16}$-D-homoandrostatriene.

7. The method of making the compound of claim 4 which comprises admixing 3-keto-$\Delta^{5,9(11),16}$-4-oxa-D-homoandrostatriene with methyl magnesium bromide in the presence of diethyl ether, decomposing the addition product so obtained by acidification with a dilute mineral acid, treating the ether solubles of the acidified mix with an alkali metal hydroxide and recovering 3-keto-$\Delta^{4,9(11),16}$-D-homoandrostatriene.

References Cited in the file of this patent

Woodward et al.: JACS 73, May 1951, pgs. 2303–2304.
Woodward et al.: JACS 74, Sept. 1952, pgs. 4223–4251.